Jan. 23, 1968   D. B. BALLANTYNE   3,365,232
SUNSHADE ASSEMBLY
Filed Jan. 18, 1966

INVENTOR.
David B. Ballantyne
BY
Herbert Furman
ATTORNEY

United States Patent Office 3,365,232
Patented Jan. 23, 1968

3,365,232
SUNSHADE ASSEMBLY
David B. Ballantyne, Southfield, Mich., assignor to General Motors Corporation, Detroit, Mich., a corporation of Delaware
Filed Jan. 18, 1966, Ser. No. 521,390
4 Claims. (Cl. 296—97)

This invention relates to sunshade assemblies and more particularly to a sunshade assembly having improved means for mounting a sunshade on a support arm.

One feature of this invention is that it provides a sunshade assembly having a preformed wire member which includes a plurality of loops frictionally engaging a support arm and a plurality of torsion legs connected to the loops. Another feature of this invention is that the legs grip opposing sides of the sunshade and that interconnecting means interconnect successive pairs of legs through the sunshade to support the sunshade on the support arm. A further feature of this invention is that the loops and legs are formed integral with each other and that the interconnecting means are formed integral with the successive pairs of legs.

These and other features of the sunshade assembly will be readily apparent from the following specification and drawings wherein.

Figure 1:
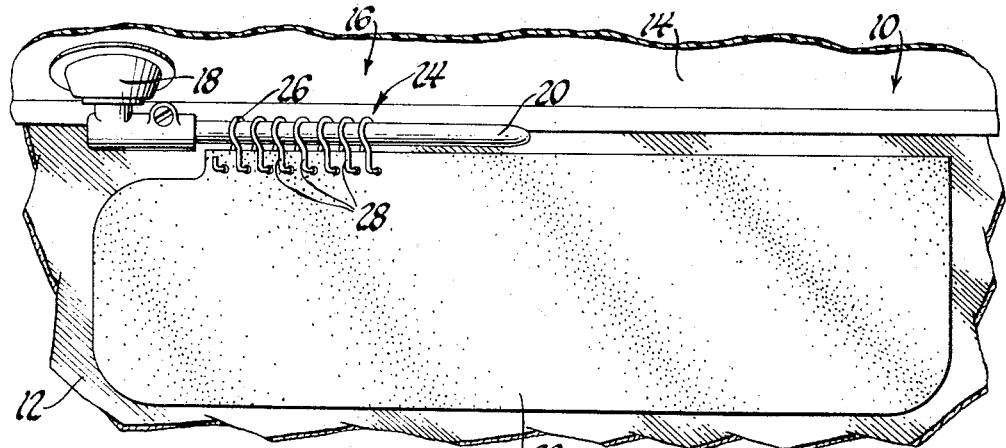
FIGURE 1 is a partial view of a vehicle body embodying a sunshade assembly according to this invention.

Referring now particularly to FIGURE 1 of the drawings, a vehicle body designated generally 10 includes a windshield 12, the upper end of which is conventionally mounted in a body header structure, not shown, which is concealed from view by the body headlining 14. A sunshade assembly 16 according to this invention includes a swivel socket structure 18 which mounts a support arm 20 for both vertical and horizontal movement. Reference may be had to Keating 3,017,217 for the details of the structure 18. A sunshade 22 is mounted on the arm 20 by mounting means 24 according to this invention.

The mounting means generally comprises a plurality of spaced longitudinally aligned loops 26, each of which includes a pair of offset longitudinally spaced depending legs 28. Each leg 28 is connected to the next successive leg 28 on the opposite side of the sunshade 22 by means of a generally S-shaped interconnecting cross leg 30. The intermediate portions of the cross legs 30 extend through successive openings 32 in the sunshade 22 and the lateral end portions of the legs 30 grip opposite sides of the sunshade therebetween.

Figure 2:
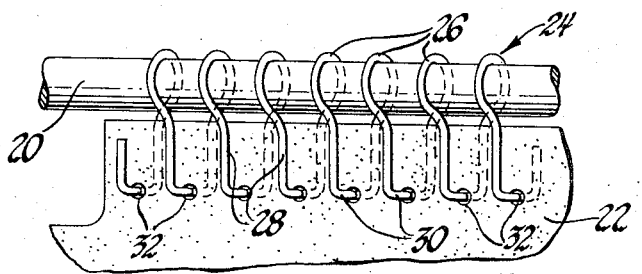
FIGURE 2 is an enlarged view of a portion of FIGURE 1.
Figure 3:
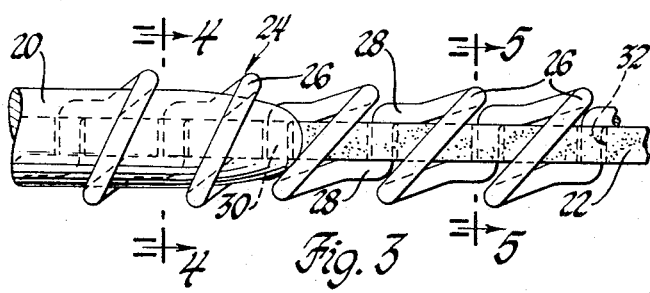
FIGURE 3 is a view of the assembly being mounted on the support arm.
Figure 6:
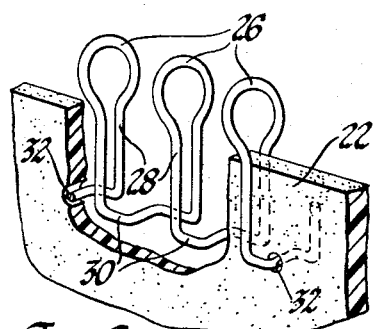
FIGURE 6 is a partially broken away perspective view.

When the mounting means are assembled to the sunshade 22 as shown in FIGURES 2, 3 and 6, the depending offset legs 28 of each loop 26 and the end portions of the leg 30 grip opposite sides of the sunshade 22 therebetween. It will be noted with reference to FIGURE 3 that the loops 26 of the mounting means are angularly located with respect to their longitudinal axis and the plane of the sunshade 22.

Figures 4, 5:
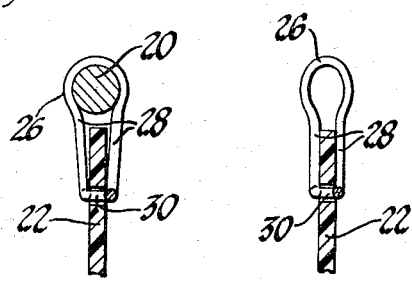
FIGURE 4 is a sectional view taken generally along the plane indicated by line 4—4 of FIGURE 3.
FIGURE 5 is a sectional view taken generally along the plane indicated by line 5—5 of FIGURE 3.

When the mounting means and sunshade are assembled to the arm 20 by forcing the successive loops over the end of the arm, FIGURE 3, the loops 26 and legs 28 thereof are twisted relative to legs 30 about an axis transverse of the longitudinal axis of the loops so that they approach a normal relationship to their longitudinal axis. The legs 28 try and return the loops 26 to their normal position as shown in FIGURES 5 and 6 and thereby cause the loops to tightly and frictionally engage the periphery of the support arm 20 as can be seen by reference to FIGURE 4.

The depending legs 28 function as torsion rods or members while the interconnecting legs 30 function as the anchoring means for these legs so that when the mounting means and the sunshade 22 are assembled to the rod 20, the sunshade will thereafter remain in any position to which it is adjusted with respect to the arm 20.

Thus, this invention provides an improved sunshade support assembly.

I claim:

1. A vehicle body sunshade assembly comprising, a support rod adapted to be mounted on a vehicle body, a sunshade, and mounting means for mounting the sunshade on the support arm, said means including a plurality of loop portions surrounding a major portion of the periphery of the support arm, each of said loop portions including a pair of depending legs, anchor means interconnecting successive pairs of legs and gripping opposite sides of said sunshade, said successive pairs of legs functioning as torsion members twisting said loop portions about an axis transversely of the longitudinal axis thereof to cause said loop portions to frictionally engage said support arm.

2. A sunshade assembly as recited in claim 1 wherein said sunshade includes a plurality of openings and said anchor means extends through said openings and interconnects successive pairs of legs on opposite sides of the sunshade.

3. A sunshade assembly as recited in claim 1 wherein said anchor means includes a leg extending through said sunshade and having portions thereof gripping said sunshade to each side thereof and being secured to successive pairs of legs of said loop portions.

4. A sunshade assembly as recited in claim 1 wherein said anchor means includes a generally S-shaped leg extending through said sunshade and having the end portions thereof engaging opposite sides of the sunshade, said leg, said loop portions and said depending legs being formed integral with each other.

References Cited

UNITED STATES PATENTS 3,150,896  9/1964  Plattner _____ 296—97
3,333,886  8/1967  Wenger _____ 296—97

LEO FRIAGLIA, *Primary Examiner.*

L. D. MORRIS, *Assistant Examiner.*